Feb. 19, 1946.    F. S. BEACH ET AL    2,394,972
CONSUMPTION REGISTER
Filed May 5, 1944    3 Sheets-Sheet 1
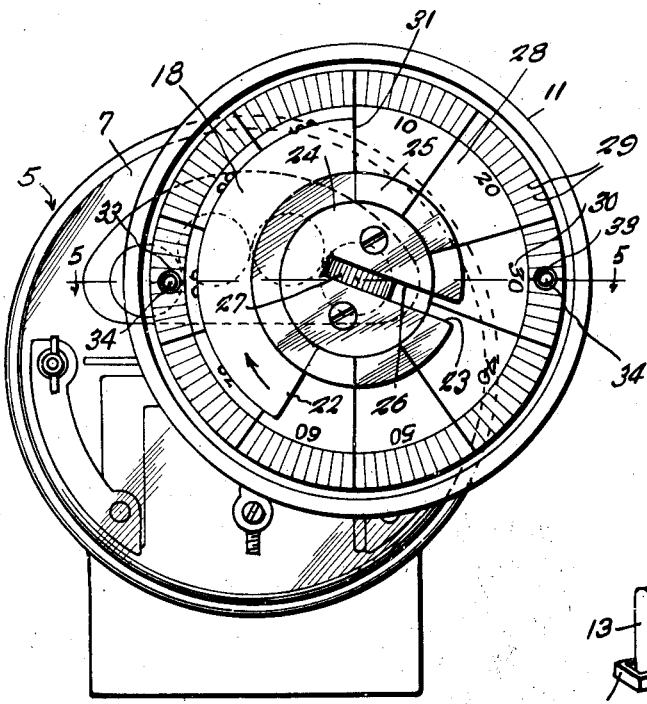
Fig. 1.
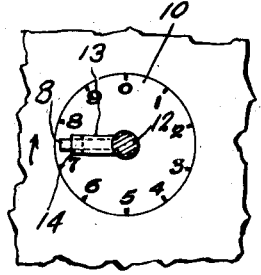
Fig. 6
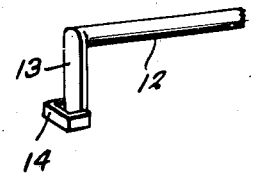
Fig. 7
Fig. 2.
Inventor
FRED S. BEACH
ROSE B. BEACH,
By *Clarence A. O'Brien*
*and Harvey B. Jacobson*
Attorneys Inventor
FRED S. BEACH
ROSE B. BEACH,
By Clarence A. O'Brien
and Harvey B. Jacobson
Attorneys Feb. 19, 1946. F. S. BEACH ET AL 2,394,972
CONSUMPTION REGISTER
Filed May 5, 1944 3 Sheets-Sheet 3
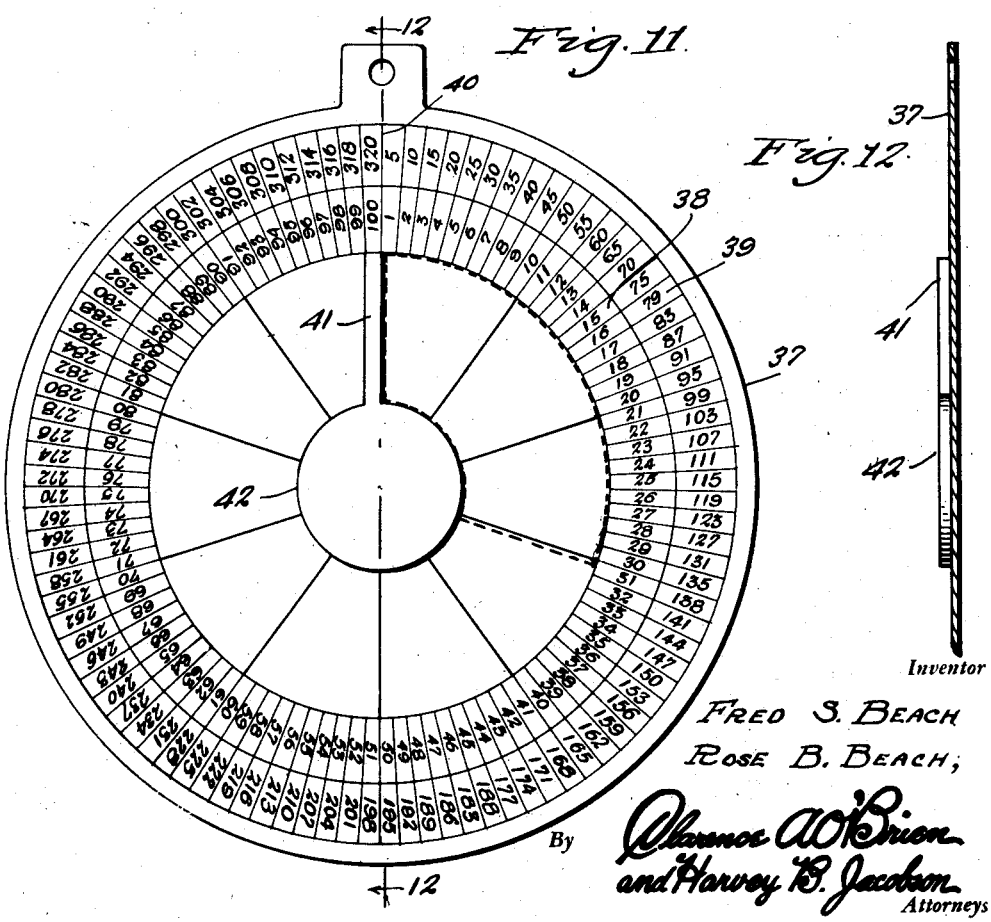
Inventor
FRED S. BEACH
ROSE B. BEACH;
By Clarence A. O'Brien
and Harvey B. Jacobson
Attorneys Patented Feb. 19, 1946

2,394,972

UNITED STATES PATENT OFFICE 2,394,972

CONSUMPTION REGISTER

Fred S. Beach and Rose B. Beach,
Charlotte, Mich.

Application May 5, 1944, Serial No. 534,323

9 Claims. (Cl. 234—58)

This invention relates to a consumption registering mechanism for meters, and has particular reference to an improvement upon the type of device disclosed in our co-pending application Serial No. 495,464, filed July 20, 1943.

The primary object of the present invention is to provide an improved registering mechanism of the above kind which will feed out predetermined portions of a helical measuring strip, so that the lengths of said strip portions will indicate the amount of a commodity consumed and may be used to determine the cost of the consumed amount of the commodity.

Another object of the invention is to provide a registering mechanism of the above character in which the portions of the measuring strip which are fed out are exhibited so that an inspection will indicate at all times the amounts registered since the last severance of the strip.

A further object of the present invention is to provide a registering mechanism of the above character in which provision is made for facilitating ready and accurate severance of the outwardly fed portions of the measuring strip from the remainder of the latter.

Still another object of the invention is to provide means for supporting the helical measuring strip and for feeding predetermined lengths of the measuring strip outwardly so that the outermost convolutions or helices of the strip are expanded to make proper severance of the outwardly fed portions a comparatively convenient and easy operation.

Another object of the invention is to provide a registering mechanism of the above kind which can be easily and quickly installed or removed, which is highly efficient in operation, and which is of such a simple nature that it may be expeditiously and economically manufactured.

Other objects and features of the invention will become apparent from the following description when considered in connection with the accompanying drawings, and the invention consists in the novel form, combination and arrangement of parts hereinafter more fully described, shown in the drawings and claimed.

In the drawings, wherein like reference characters indicate corresponding parts throughout the several views:

Figure 1 is a front elevational view showing an electric meter provided with a registering mechanism constructed in accordance with the present invention.

Figure 2 is a view similar to Figure 1 with the measuring strip removed.

Figure 6 is an enlarged fragmentary vertical section taken substantially upon line 6—6 of Figure 3.

Figure 7 is a fragmentary perspective view showing the inner portion of the feeding disc-carrying shaft and its crank arm.

Figure 8 is a fragmentary detail view, partly in side elevation and partly in section, showing the operative connection between the feeding disc-carrying shaft and the unit hand of the meter.

Figure 10 is a perspective view of the helical measuring strip with several of its convolutions expanded to more clearly reveal the nature of the graduations on the strip.

Figure 11 is a plan view of the calculator with which the severed portions of the measuring strip are adapted to be employed for determining the cost of the quantity of a commodity shown to be consumed by such portions of the measuring strip.

Figure 12 is a fragmentary section on a reduced scale taken on line 12—12 of Figure 11.

Figure 3:
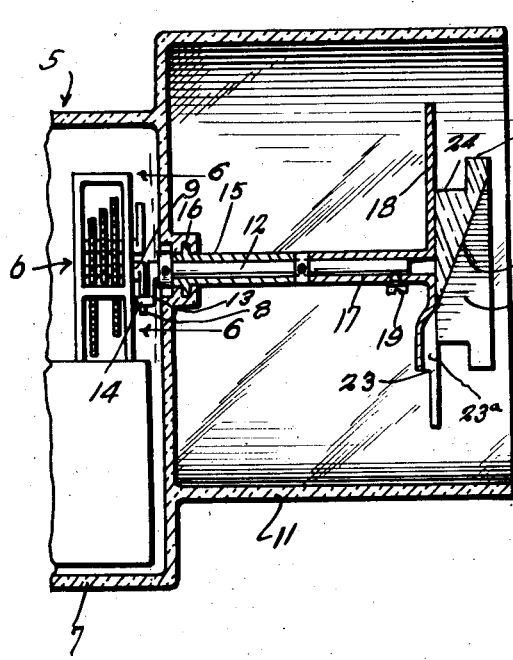
Figure 3 is a fragmentary vertical section taken substantially upon line 3—3 of Figure 2, but with the strip feeding disc rotated to a position wherein its radial scissors-receiving slot is vertically positioned at the bottom portion of the disc.

The improved consumption register which forms the subject matter of this application is adapted to be used with any conventional meter that indicates the quantity of a commodity supplied to or consumed by a customer. For purposes of illustration, the invention has been shown as applied to a conventional electric meter 5 having a metering mechanism 6 covered by a transparent bowl 7 and including a unit hand 8 carried by the forward end of a shaft 9 and movable over a dial 10.

In accordance with the present invention, a housing 11 is attached to or formed integral with the front of the bowl 7, and a horizontal shaft 12 is disposed centrally of the housing 11 and projects rearwardly through the front wall of bowl 7 in line with the shaft 9 of the unit hand 8 of the meter. The rear end of shaft 12 is provided with a crank arm 13 having a lateral loop 14 at its free end which receives the unit hand 8 so as to provide a driving connection between the shaft 9 and the shaft 12. The shaft 12 may be journaled in a bearing sleeve 15 having its rear end anchored in the front wall of bowl 7, as at 16, and fitted on the forward projecting end of shaft 12 is the tubular hub 17 of a strip-feeding disc 18. A set screw 19 may be provided to secure the hub 17 to the shaft 12 for rotation with the latter. The strip-feeding disc 18 is provided with a marginal radial slit 20, and the portion of the disc 21 at one side of this slit is directed rearwardly, while the portion 22 at the other side of the slit 20 is directed forwardly, for a purpose which will later become apparent. Also, at another point, the disc 18 is provided with a radial slot 23 that opens through the peripheral edge of the disc and whose purpose will also later become apparent.

A relatively large hub member of short cylindrical form, indicated at 24, is secured centrally of and to the front of the disc 18, and this hub member has an annular external flange 25 at its forward end. The hub member 24 and its flange 25 are preferably made of transparent plastic material, and this element has a radial slot 26 that opens through the periphery thereof in registry with the slot 23 of the disc 18. As shown clearly in Figure 3, the inner end wall 27 of the slot 26 is inclined rearwardly and outwardly so that the rear end of said wall 27 coincides with the inner end wall of slot 23.

Figure 5:
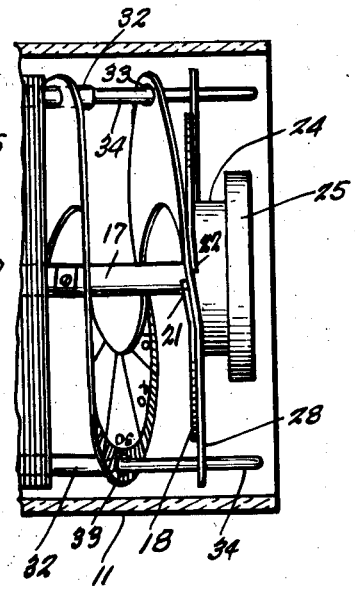
Figure 5 is a fragmentary horizontal section taken substantially upon line 5—5 of Figure 1, but with the internal parts in top plan.
Figure 4:
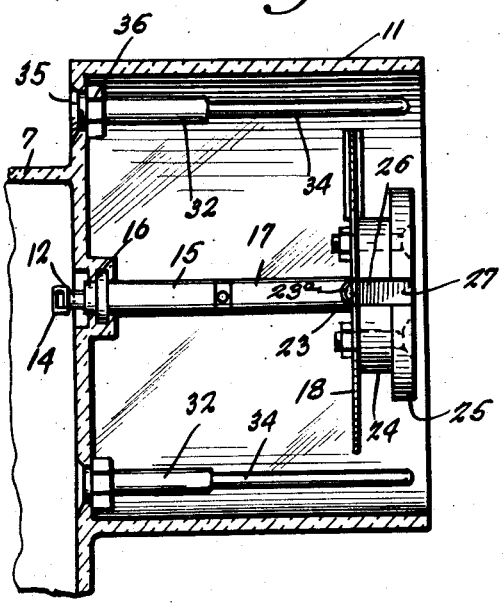
Figure 4 is a fragmentary view of the apparatus as shown in Figure 3, party in bottom plan and partly in horizontal section.
Figure 9:
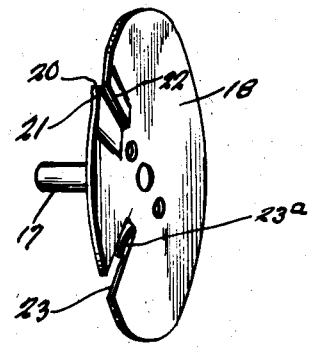
Figure 9 is a perspective view of the feeding disc.

The present registering mechanism is adapted to employ a helical measuring strip 28 of the form shown in Figures 1, 5 and 10. The convolutions or helices of the strip 28 are normally compacted, and the form of the strip is such that when the convolutions are expanded, they take the form of an Archimedean screw, as illustrated in Figure 5. Provided on the forward faces of the convolutions of strip 28 are graduations 29 and numerals 30 which indicate the unit of measurement of the meter with which the registering mechanism is employed. For instance, in the case of the electric meter, the graduations will indicate consumption of electric current in kilowatt hours, the numerals 30 progressing from the forward end 31 of the strip to the rear end thereof. The compacted helical registering strip 28 is adapted to be supported in the housing 11 behind the disc 18 in spaced concentric relation to and surrounding the shaft 12. For this purpose, the housing 11 has forwardly projecting supporting pins 32 therein at opposite sides of the shaft 12, and registering openings 33 are provided through the convolutions of the measuring strip 28 at opposite sides of the helix formed by said strip, said registering openings 33 being adapted for snug reception of the larger inner end portions of pins 32. Pins 32 have forward end portions 34 of reduced diameter for a purpose which will presently become apparent, and said pins 32 may have headed rear ends 35 anchored in openings in the wall at the back of housing 11 and rigidly fixed in place by means of lock nuts 36 threaded on the inner end portions of pins 32 and tightened against the front surface of said wall. The central opening of the helix formed by the measuring strip is of a diameter to snugly receive the hub member 24, and the flange 25 will prevent the strip from being projected outwardly through the open front of the housing 11 as the portions of the strip 28 are fed forwardly onto the hub member 24 in front of the disc 18.

At the proper intervals, the portion of the strip 28 fed to a position in front of the disc 18 may be severed from the remainder of said measuring strip by inserting a pair of scissors through the slots 26 and 23. Due to the fact that the forward convolutions of the measuring strip are expanded, the scissors may be used to readily sever the portions in front of the disc 18 without engaging or mutilating the portion of the strip behind the disc 18. This expanding of the forward convolutions of measuring strip 28 is effected by reason of the fact that the convolutions will not pass forwardly very freely from the larger rear portions of the pins 32, but will freely expand after passing onto the forward portions 34 of said pins which are of smaller diameter.

In use, the front end 31 of the strip 28 is passed forwardly through the slit 20, and as the disc 18 rotates in a clockwise direction as viewed in Figure 1, the strip 28 is directed through the slit 20 to a position in front of the disc 18. At an appointed or predetermined time, the portion of the strip 28 in front of the disc 18 is severed from the remainder thereof at the point coincident with the slots 26 and 23, thereby giving a record of the amount of the commodity consumed for a predetermined time or the amount of a commodity supplied to the customer in any particular instance.

To facilitate determination of the cost of a commodity supplied or consumed, as indicated by the severed portion of the measuring strip, said severed portion of the measuring strip may be employed in conjunction with a calculator of the type illustrated in Figures 11 and 12. As shown, this calculator includes a disc 37 having two concentric marginal dials 38 and 39, respectively graduated and numbered to indicate the quantity of commodity supplied or consumed and the cost thereof. For instance, the numeral 15 of the dial 38 may indicate the consumption of 15 kilowatt hours of current, and the number 75 of the dial 39 radially aligned with said numeral 15 indicates that the cost of this quantity of current is 75 cents. The graduations of both dials commence at a common zero line 40, and radially aligned with this line 40 is one side of a radial arm 41 projecting from a central disc 42 provided upon the main disc 37. Arm 41 is disposed inwardly of the dials 38 and 39 and is of a length corresponding to the width of the measuring strip 28, while the small central disc 42 is of a diameter corresponding to the diameter of the central opening formed by the helical measuring strip. Thus, a portion of strip 28 which has been severed from the rest thereof may be disposed upon the calculator disc 37 with its inner edge contacting the periphery of the central disc 42 and with its end having the lowest quantity indicating graduation disposed against the adjacent side of the arm 41 in line with the zero indicating line 40. The other end of the severed trip portion will coincide with the numeral of dial 38 that indicates the quantity of commodity supplied or consumed, and by referring to the numeral of the dial 39 which is aligned with that numeral of dial 38, the cost of this quantity of commodity can be readily determined.

It will of course be readily apparent that as the measuring strip is restrained against turning, rotation of disc 18 will effect the forward feeding of the measuring strip through the slit 20 to a position in front of said disc 18. In the case of an electric meter or the like, the customer can cut off the portion of the measuring strip which is located in front of the disc 18 ahead of the slots 26 and 23, and as the portions of the measuring strip are always cut at the point where these slots occur, a fair or honest reading of the mechanism is insured. The customer may take the severed portion of the measuring strip and employ it in connection with the calculator of Figure 11 to determine the cost of the commodity consumed, mailing this severed portion of the measuring strip with a remittance to cover the cost. All the customer has to do is to sign the severed portion on the back, date it and mail it with the remittance to the utility company. This eliminates billing the customers and minimizes the amount of bookkeeping required on the part of the utility company.

It will be particularly noted that the feeding disc 18 has a radial rearward depression or groove 23a in the front thereof and at the inner end of and in line with the slot 23, so as to permit the free end of one scissors blade to engage behind the inner edge portion of the part of the measuring strip that is located in front of the disc 18, but to prevent the scissors blades from passing rearwardly to and cutting the portion of the strip directly behind disc 18.

From the foregoing description, it is believed that the construction and operation, as well as the advantages of the present invention, will be readily apparent to those skilled in the art. It will be apparent that the invention is simple, compact and efficient, affording a mechanism of the character described which is calculated to meet with the requirements for a successful commercial use. Minor changes in details of construction illustrated and described are contemplated, such as fairly fall within the spirit and scope of the invention as claimed.

What we claim is:

1. The combination with an automatic registering meter, of means actuated by the registering mechanism of the meter for issuing a helical measuring strip graduated in correspondence with the unit of measurement of the meter, said strip-issuing means including a rotatably driven strip-feeding disc provided with a radial slot to facilitate passage of the strip therethrough and a second radial slot to facilitate severance of the issued portion of the strip at a predetermined point and so as to leave part of the strip in front of the disc after severance of the issued portion.

2. The combination with an automatic registering meter, of means actuated by the registering mechanism of the meter for issuing a helical measuring strip graduated in correspondence with the unit of measurement of the meter, said strip-issuing means including a rotatably driven strip-feeding disc having a marginal radial slit adapted to have the end of the measuring strip passed forwardly therethrough.

3. The combination with an automatic registering meter, of means actuated by the registering mechanism of the meter for issuing a helical measuring strip graduated in correspondence with the unit of measurement of the meter, said strip-issuing means including a rotatably driven strip-feeding disc having a marginal radial slit adapted to have the end of the measuring strip passed forwardly therethrough, and a strip-receiving hub provided centrally on said disc at the front of the latter, said hub having a circular periphery whose radius of curvature conforms to that of the inner edge of the measuring strip.

4. The combination with an automatic registering meter, of means actuated by the registering mechanism of the meter for issuing a helical measuring strip graduated in correspondence with the unit of measurement of the meter, said strip-issuing means including a rotatably driven strip-feeding disc having a marginal radial slit adapted to have the end of the measuring strip passed forwardly therethrough, and a strip-receiving hub provided centrally on said disc at the front of the latter, said hub having a circular periphery whose radius of curvature conforms to that of the inner edge of the measuring strip, said hub further having a strip-retaining annular flange at its forward end.

5. The combination with an automatic registering meter, of means actuated by the registering mechanism of the meter for issuing a helical measuring strip graduated in correspondence with the meter, said strip-issuing means including a rotatably driven strip-feeding disc having a marginal radial slit adapted to have the end of the measuring strip passed forwardly therethrough, and a strip-receiving hub provided centrally on said disc at the front of the latter, said hub having a circular periphery whose radius of curvature conforms to that of the inner edge of the measuring strip, said hub and said disc having radial aligned slots therethrough, the inner end wall of the slot in the hub being inclined rearwardly and coinciding at its rear end with the inner wall of the slot of the disc to facilitate insertion of a pair of scissors for severing the issued portion of the strip from the remainder thereof.

6. A registering mechanism for meters comprising a stationary housing, a pair of forwardly projecting pins fixed to the housing for supporting an apertured helical measuring strip, a central rotatable shaft journaled in the housing, means to operatively connect the rear end of the shaft with the unit hand of the meter, and a feed disc carried by the forward end of and rotatable with said shaft and having a radial slot for the forward passage of the measuring strip therethrough.

7. A registering mechanism for meters comprising a stationary housing, a pair of forwardly projecting pins fixed to the housing for supporting an apertured helical measuring strip, a central rotatable shaft journaled in the housing, means to operatively connect the rear end of the shaft with the unit hand of the meter, a feed disc carried by the forward end of and rotatable with said shaft and having a radial slot for the forward passage of the measuring strip therethrough, and a receiving hub for the portion of the measuring strip issued in front of said disc.

8. A registering mechanism for meters comprising a stationary housing, a pair of forwardly projecting pins fixed to the housing for supporting an apertured helical measuring strip, a central rotatable shaft journaled in the housing, means to operatively connect the rear end of the shaft with the unit hand of the meter, and a feed disc carried by the forward end of and rotatable with said shaft and having a radial slot for the forward passage of the measuring strip therethrough, said supporting pins having relatively large rear portions offering predetermined resistance to expansion of the major portion of the helical measuring strip disposed thereon behind said disc and being provided with forward portions of smaller diameter which permit free expansion of the forward convolutions of said measuring strip.

9. A registering mechanism for meters comprising a stationary housing, means to support and restrain against rotation within the rear of said housing a helical measuring strip, means including a rotatable strip-feeding disc at the front of the housing for feeding the measuring strip forwardly thereof, and means to operatively connect said disc to the registering mechanism of the meter so as to be driven by the latter.

FRED S. BEACH.
ROSE B. BEACH.